(12) United States Patent
Courtier et al.

(10) Patent No.: US 12,140,046 B2
(45) Date of Patent: Nov. 12, 2024

(54) FASTENING ASSEMBLY FOR A TURBOMACHINE BLADE

(71) Applicant: Safran Aircraft Engines, Paris (FR)

(72) Inventors: Vivien Mickaël Courtier, Moissy-Cramayel (FR); Christophe Paul Jacquemard, Moissy-Cramayel (FR); Vincent Joudon, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/032,048

(22) PCT Filed: Oct. 16, 2020

(86) PCT No.: PCT/FR2020/051866
§ 371 (c)(1),
(2) Date: Apr. 14, 2023

(87) PCT Pub. No.: WO2022/079360
PCT Pub. Date: Apr. 21, 2022

(65) Prior Publication Data
US 2023/0383658 A1    Nov. 30, 2023

(51) Int. Cl.
*F01D 5/30* (2006.01)
*B64C 11/04* (2006.01)
(Continued)

(52) U.S. Cl.
CPC ............ *F01D 5/3015* (2013.01); *B64C 11/04* (2013.01); *F01D 5/326* (2013.01);
(Continued)

(58) Field of Classification Search
CPC ............................. F01D 5/3015; F01D 5/326
See application file for complete search history.

(56) References Cited

U.S. PATENT DOCUMENTS

| H1258 H | * | 12/1993 | Hindle, Jr. ............ F01D 5/3038 411/393 |
| 9,739,160 B2 | * | 8/2017 | Kain ........................ F01D 5/30 |
| 2010/0284805 A1 | | 11/2010 | Uskert et al. |

FOREIGN PATENT DOCUMENTS

| EP | 1 905 957 A1 | 4/2008 |
| EP | 2 009 245 A1 | 12/2008 |

(Continued)

OTHER PUBLICATIONS

English translation of the International Search Report and Written Opinion of the International Searching Authority for International Application No. PCT/FR2020/051866, dated Jun. 29, 2021.

*Primary Examiner* — Courtney D Heinle
*Assistant Examiner* — John S Hunter, Jr.
(74) *Attorney, Agent, or Firm* — BIRCH, STEWART, KOLASCH & BIRCH, LLP (57) ABSTRACT

The invention relates to an assembly for a turbine engine blade, the assembly comprising a fastener defining a well for receiving a blade root, and a clamping device for clamping the blade root against the fastener when the blade root is received in the well, wherein the clamping device comprises: at least one clamping member suitable for bearing simultaneously on the blade root and on the fastener in the well so as to exert a clamping force on the blade root, the clamping member defining a threaded hole, and a resilient layer arranged to bear in the well on the blade root, a rod comprising a thread engaging with the threaded hole so that a rotation of the rod with respect to the clamping member causes a variation in the clamping force exerted by the clamping member on the root.

13 Claims, 11 Drawing Sheets

(51) Int. Cl.
  *F01D 5/32* (2006.01)
  *B64D 27/00* (2006.01)
(52) U.S. Cl.
  CPC .. *B64D 2027/005* (2013.01); *F05D 2220/323* (2013.01); *F05D 2260/31* (2013.01)

(56) References Cited

FOREIGN PATENT DOCUMENTS

| | | |
|---|---:|---|
| EP | 2 425 100 B1 | 2/2015 |
| EP | 3 073 054 A1 | 9/2016 |
| WO | WO 2015/057424 A1 | 4/2015 |
| WO | WO 2021/074554 A1 | 4/2021 |

* cited by examiner

FASTENING ASSEMBLY FOR A TURBOMACHINE BLADE

FIELD OF THE INVENTION

This invention relates to an assembly for a turbomachine serving to attach a blade of such a turbomachine to a fastener.

PRIOR ART

A conventional fan comprises a blade fastener defining a recess to receive a root of a blade. The blade fastener comprises two opposing flanks, together defining a passage giving into the recess and forming stops preventing the root from leaving the recess through the passage. A blade root can be engaged in the recess through two opposite access-ways.

However, in certain configurations of fan, a blade can undergo a turbulent aerodynamic flow, completely separated, which generates a vibrational excitation over a wide band. Due to this vibrational excitation, the blade root is liable to flap in the recess in which this root is received. However, such flapping risks damaging the blade or the fastener defining the recess.

It has been proposed to insert into such a recess a shim with the blade root, particularly in the document EP2425100. The shim, deformable, is force-fitted in the recess between the blade root and the fastener, either by hand or with a mallet. Such insertion under force allows the shim to be simultaneously bearing on the blade root and on the fastener according to a bearing force of a weight in the order of 50 kilograms, when the fan is stopped.

However, such a shim is not capable of systematically preventing the abovementioned flapping phenomenon. Specifically, when a fan is rotated at a nominal rotation speed, the blade root rises back up inside the recess under the effect of centrifugal force, thus increasing the space between it and the bottom of the recess, so that the force exerted by the shim on the fastener decreases when the shim returns to its initial unstressed geometry, hence the appearance of flapping of the blade root, or even swiveling of the blade.

SUMMARY OF THE INVENTION

An aim of the invention is to more effectively prevent the root of a turbomachine blade from flapping, in particular at a high rotation speed.

For this purpose provision is made, according to a first aspect, for an assembly for a turbomachine blade, the assembly comprising:
- a fastener defining a recess for receiving a blade root, and
- a clamping device for clamping the blade root against the fastener when the blade root is in the recess, the clamping device comprising:
  - at least one clamping element suitable for bearing simultaneously on the blade root and on the fastener in the recess so as to exert a clamping force on the blade root, the clamping element defining a tapped hole, in which the clamping element comprises an elastic layer arranged to bear in the recess on the blade root,
  - a shank comprising a thread interacting with the tapped hole so that a rotation of the shank with respect to the clamping element causes a variation in the clamping force exerted by the clamping element on the blade root.

The fact of varying the force exerted by the clamping element by means of a threaded shank makes it possible to reach higher clamping forces than the simple bearing forces obtained by inserting a shim under force by hand or with a mallet. Thus, even if the clamping element undergoes centrifugal force during the operation of the turbomachine, thus causing a reduction in the clamping force exerted by the clamping element on the fastener, this reduction is not significant enough to prevent the clamping element from firmly clamping the fastener. This is why the clamping element prevents the blade from flapping even at a high rotation speed.

The elastic layer element is compressible to be stressed against the blade root in such a way as to maintain the stress on the blade, the root of which is displaced under centrifugal force and/or displaced by aerodynamic stresses. The elasticity bearing force for stress under the blade root is approximately 10 times to 20 times greater than the elastic return force of an elastic deformable shim as defined in the document EP2425100 or in the document EP2009245.

The assembly in a first aspect may also comprise the following optional features, taken alone or in combination when it is meaningful to do so.

Preferably:
- the clamping element is configured to be displaced with respect to the fastener when the shank is rotated with respect to the fastener,
- the fastener and the clamping element have shapes suitable for the displacement of the clamping element with respect to the fastener to cause the variation of the clamping force exerted by the clamping element on the root.

Preferably, the clamping element bears on a bottom surface of the recess forming a slope inclined with respect to the axis of rotation of the shank.

Preferably, the clamping element comprises a metallic part defining the tapped hole.

Preferably, the elastic layer has a thickness ranging from 1 millimeter to 4 millimeters.

Preferably, the clamping device comprises a stop limiting a track of translation of the shank along the axis of rotation of the shank, with respect to the fastener.

Preferably, the assembly comprises a first lock preventing the root from leaving the recess, the first lock comprising the stop.

Preferably, the shank comprises an end portion suitable for meshing with a tool and being rotationally driven by the tool, the end portion being for example splined.

Preferably, the assembly comprises an anti-rotation device suitable for preventing the rotation of the shank with respect to the fastener.

Preferably, the anti-rotation device comprises a second lock preventing the root from leaving the recess.

Preferably, the anti-rotation device moreover comprises:
- the end portion of the shank,
- a removable socket suitable for meshing with the end portion instead of the tool, and for simultaneously meshing with the second lock.

Preferably:
- the clamping device comprises two clamping elements, each clamping element being suitable for bearing simultaneously on the root and on the fastener in the recess such as to exert a clamping force on the root, each clamping element defining a tapped hole,
- the shank comprises two threads respectively interacting with the two tapped holes so that a rotation of the shank with respect to the clamping element causes a variation of the same sign of the clamping forces respectively exerted by the two clamping elements on the root.

Preferably:

the two clamping elements are configured to be displaced with respect to the fastener when the shank is rotated with respect to the fastener, the fastener and the two clamping elements have suitable shapes so that the respective displacements of the two clamping elements with respect to the fastener cause the variations of the clamping forces respectively exerted by the two clamping elements on the root.

Preferably, the two clamping elements are configured to move away or towards one another, when the shank is rotated about the axis of rotation with respect to the fastener.

DESCRIPTION OF THE FIGURES

Other features, aims and advantages of the invention will become apparent from the following description, which is purely illustrative and non-limiting, and which must be read with reference to the appended drawings wherein.

In all the figures, similar elements bear identical reference numbers.

DETAILED DESCRIPTION OF THE INVENTION

Figure 1:
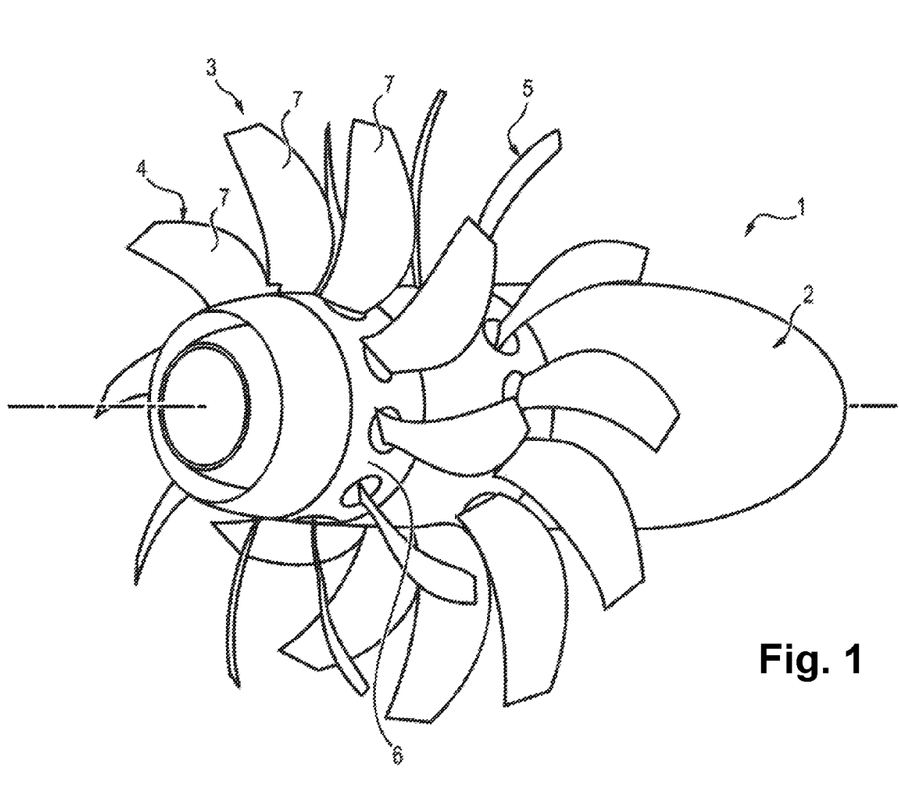
FIG. 1 is a side view of a turbomachine engine.

With reference to FIG. 1, a turbomachine comprises an engine 1 of Open Rotor type. The engine 1 comprises a pod 2 intended to be attached to a fuselage of an aircraft, and a ductless fan 3. The fan 3 comprises two counter-rotating fan rotors 4 and 5. In other words, when the engine 1 is in operation, the rotors 4 and 5 are rotationally driven with respect to the pod 2 around one and the same axis of rotation X (which coincides with a main axis of the engine).

The engine 1 as represented in FIG. 1 is in the configuration commonly known as "pusher" (i.e. the fan 3 is placed inside a power generator with an air inlet located upstream, to the right in FIG. 1).

However, the engine 1 can alternatively be in "puller" configuration (i.e. the fan is placed upstream of the power generator with an air inlet located in front, between or just behind the two fan rotors). The engine 1 can also have a still different architecture again, such as an architecture comprising a fan rotor comprising movable blades and a fan stator comprising fixed vanes (USF configuration), or else a single fan rotor (TP configuration). The invention is also applicable to a ducted fan turbomachine but also with variable setting.

In FIG. 1, each fan rotor 4, 5 comprises a hub 6 mounted rotatably with respect to the pod 2 and a plurality of blades 7 attached to the hub 6. The blades 7 extend substantially radially with respect to the axis of rotation X of the hub.

In this application, the upstream and the downstream are defined with respect to the normal direction of flow of the gas in the rotor 4, 5 and through the turbomachine. Moreover, the axis A of the rotor 4, 5, is referred to as its axis of rotation. The axial direction corresponds to the direction of the axis A and a radial direction is a direction perpendicular to this axis and passing through it. Moreover, the circumferential direction corresponds to a direction perpendicular to the axis A and not passing through it. Unless otherwise specified, the terms "inner" and "outer", respectively, are used with reference to a radial direction such that the inner part or face of an element is closer to the axis A than the outer part or face of the same element.

Figure 2:
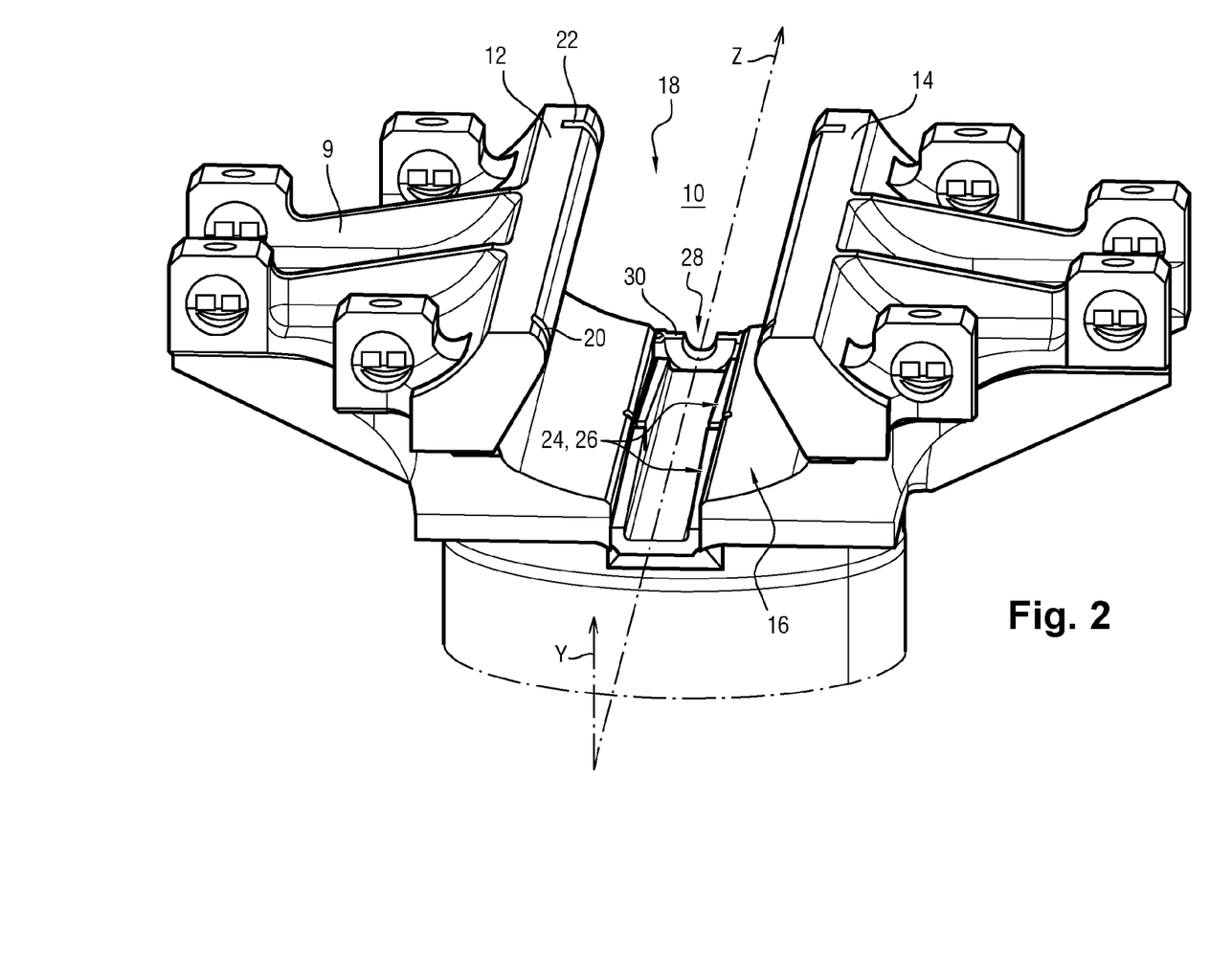
FIG. 2 is a side perspective view of a fastener for a turbomachine blade, according to an embodiment.

With reference to FIG. 2, the fan 3 comprises, for one blade 7, one fastener 9. The fastener 9 is mounted rotatably with respect to the hub 6 about an axis of setting Y. More precisely, the fastener 9 is mounted rotatably inside a housing fashioned in the hub 6, by way of balls or other rolling elements.

The fastener 9, which can also bear the name of "pivot" in the literature, defines a recess 10 to receive a root of the blade 7, the root having for example a dovetail shape.

The fastener 9 comprises in particular two flanks 12, 14 defining therebetween a radial opening of the recess 10, opposite a bottom of the recess 10. The two flanks 12, 14 are inclined toward one another and form bearing surfaces.

The recess 10 extends in a direction Z between two opposite accessways 16, 18 defined by the fastener 9. One of the two accessways 16, 18 is found on the side of a leading edge of the blade, and the other accessway is found on the side of a trailing edge of the blade. It is through one or another of these opposite accessways 16, 18 that a blade root can be engaged in translation in the recess 10.

A pair of opposing grooves 20 is formed in the flanks 12, 14 at the level of the accessway 16. It will subsequently be seen that a lock can be engaged in the grooves 20 so as to close the accessway 16 and prevent a blade root which finds itself in the recess 10 from leaving the recess 10.

Another pair of opposing grooves 22 is formed in the flanks 12, 14 at the level of the accessway 18. Further on in the text it will be seen that another lock can be engaged in the grooves 20 so as to close off the accessway 18 and prevent a blade root that is located in the recess 10 from leaving the recess 10 through this accessway 18.

Figure 11:
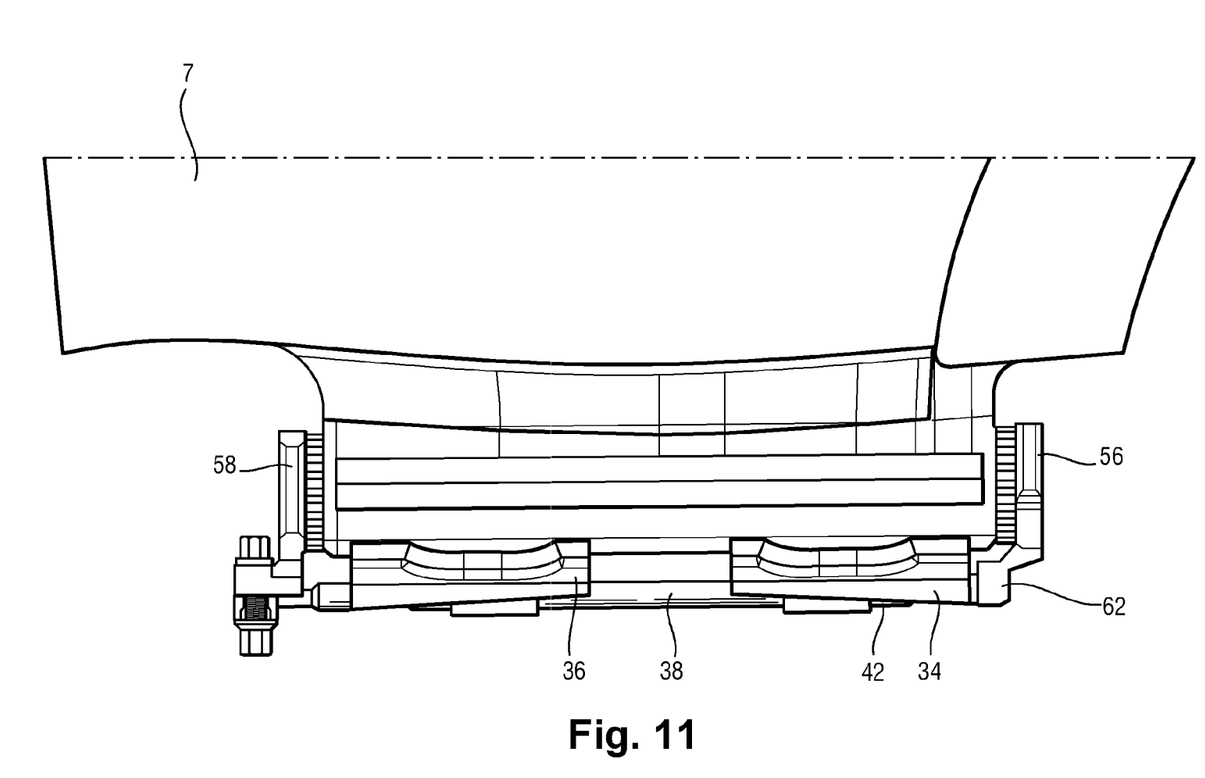
FIG. 11 is a side view of a blade root interacting with the clamping device and the locks shown in FIG. 2.

The bottom of the recess 10 comprises two bottom surfaces 24, 26 having different slopes (this is also visible in FIG. 11).

Each of the bottom surfaces 24, 26 has, for example, a straight profile in a plane parallel to the plane (Y, Z). In the remainder of the text, the term "sagittal" profile will be used to refer to the profile of a part of the fastener in a plane parallel to the plane (Y, Z).

In the embodiments illustrated in the figures, the bottom surfaces 24, 26 are inclined with respect to one another so as to meet at an apex constituting the point nearest to the upper radial opening of the recess. In other words, the bottom surfaces 24, 26 rise toward this upper radial opening when these surfaces are travelled toward the center of the recess 10. In yet other words, these bottom surfaces 24, 26 descend when they are travelled toward the two opposite accessways 16, 18 of the recess 10.

The fastener 9 moreover comprises a wall 28 radially protruding outward from the bottom of the recess 10. This wall 28 defines the lower half of an orifice.

The wall 28 has an apex delimiting a radially inward edge of the accessway 18.

Blind holes 30 open into the apex of this wall 28. The two blind holes 30 are for example tapped.

The fastener 9 is made of metal, preferably made of titanium.

Figure 3:
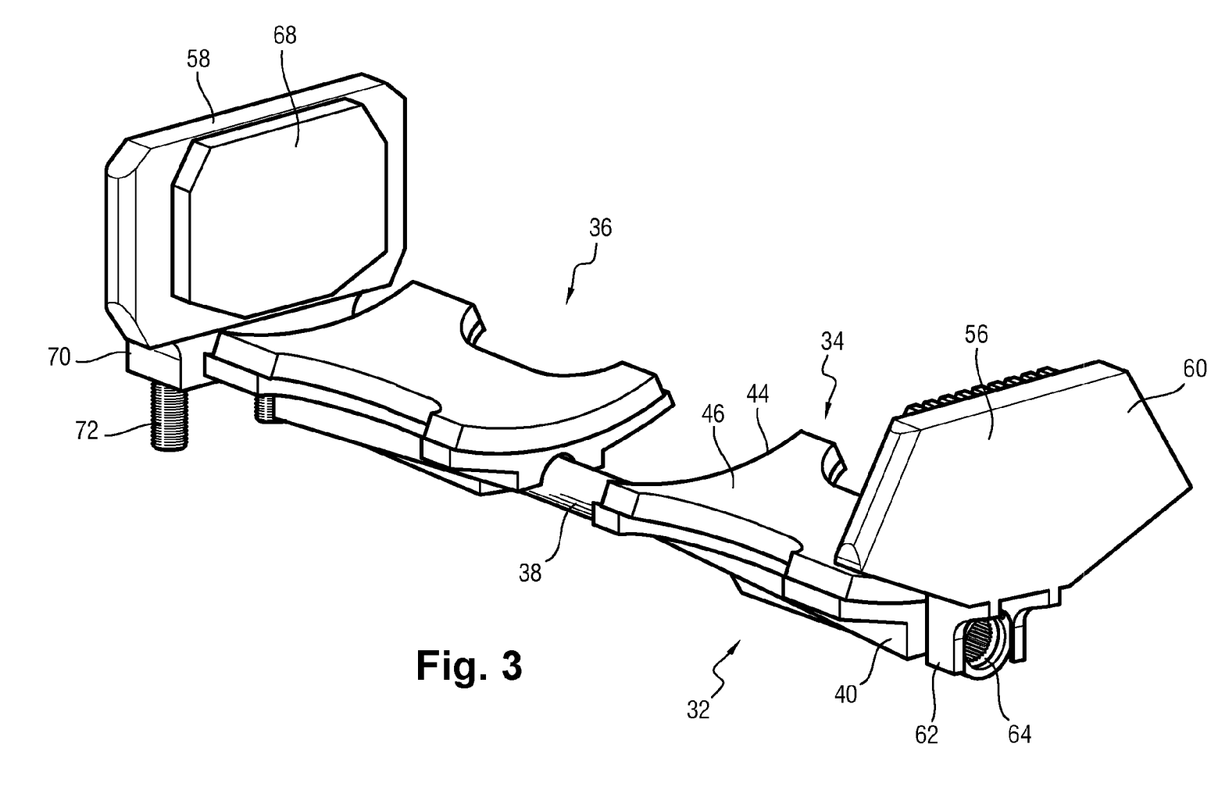
FIG. 3 is a side perspective view of a clamping device according to an embodiment and locks interacting with the fastener shown in FIG. 2.
Figure 4:
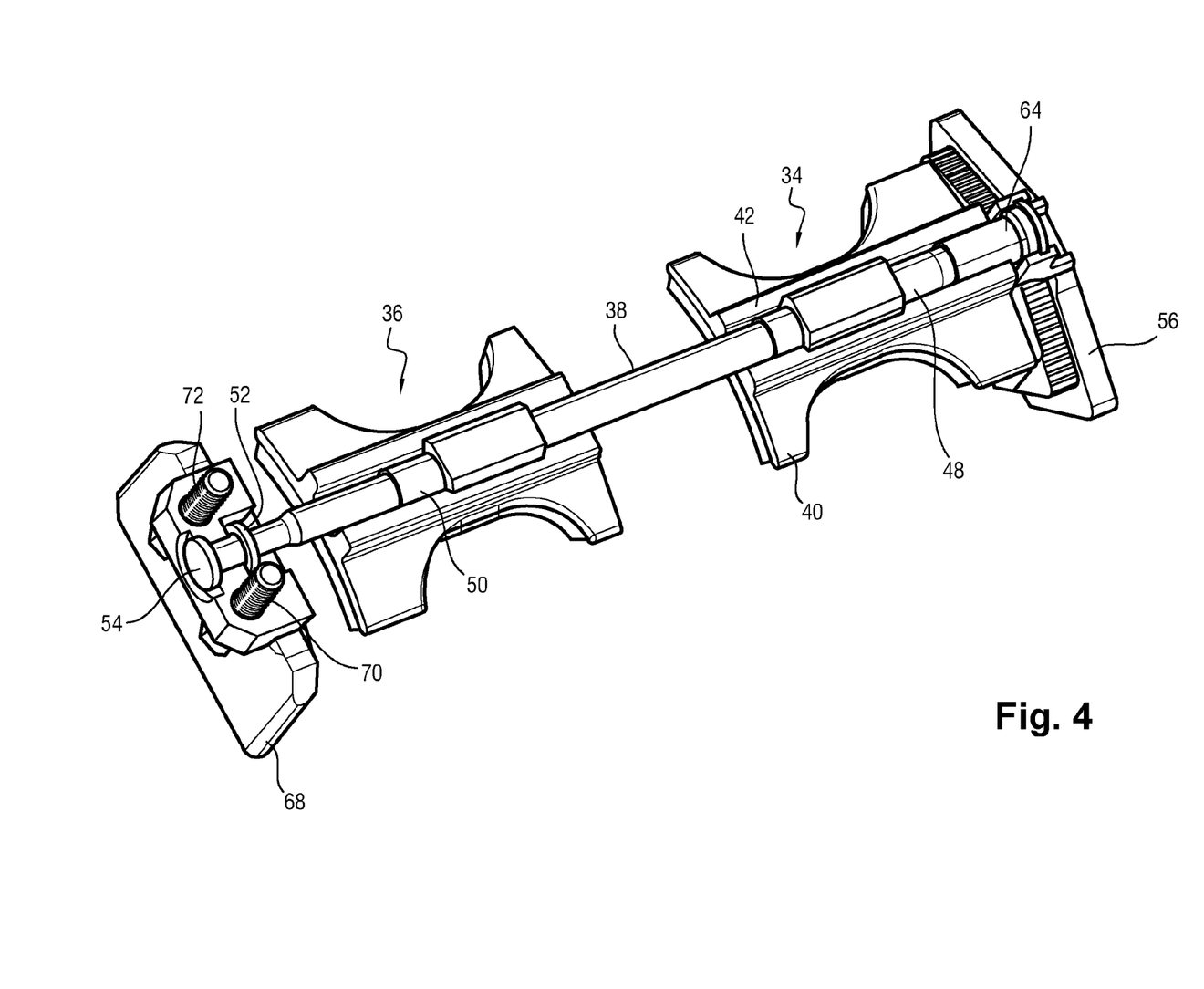
FIG. 4 is a top view of the clamping device and locks shown in FIG. 3.

With reference to FIGS. 3 and 4, a clamping device 32 has the function of clamping a blade root against the fastener 9 when the blade root is received in the recess 10.

The clamping element 32 comprises two clamping elements 34, 36 and a shank 38.

The clamping element 34 comprises a part 40 defining a tapped hole. This part 40 is made of metal or made of a composite material. The part 40 defines a lower bearing surface 42 of the clamping element 34 on the bottom surface 24.

The clamping element 34 moreover comprises an elastic layer 44, which defines an upper bearing surface 46 of the clamping element 34 on a blade root received in the recess 10.

The elastic layer 44 for example has a honeycomb shape.

The elastic layer 44 is preferably made of an elastomer or glass fiber material.

The elastic layer 44 can be bonded onto the part 40, particularly when this part 40 is made of metal. When the part 40 is made of a composite material, the elastic layer constitutes a part of this part, more particularly in the case of honeycomb.

The elastic layer 44 has a thickness ranging from 1 millimeter to 4 millimeters, preferably from 2 to 3 millimeters. The bearing surfaces 42, 46 have straight, non-parallel sagittal profiles.

The clamping element 34 has an overall H shape so as to allow a stable bearing on the blade root as long as the weight is not large.

The clamping element 36 comprises the same features discussed above as the clamping element 34. Note however that the lower bearing surface of the element 36 is intended to bear against the bottom surface 26. Moreover, the tapped hole of the clamping element 36 is threaded in an inverse direction to the tapped hole of the clamping element 34.

The shank 38 comprises a thread 48 interacting with the tapped hole of the clamping element 34, and a thread 50 interacting with the tapped hole of the clamping element 40. The two threads 48, 50 of the shank 38 extend over two separate sections of the shank 38. The two threads are threaded in two opposite directions. Thus, a rotation of the shank 38 with respect to the clamping elements 34, 36 drives a mutual separation or convergence of the two clamping elements 34, 36 in a direction parallel to the axis of rotation of the shank 38.

The shank has a first end portion suitable for meshing with a tool, such as to be rotationally driven by this tool. For this purpose, the first end portion is splined (the splines are visible in FIG. 9).

The shank has a second end portion opposite the first end portion with respect to its two threads 48, 50.

The second end portion comprises two flanges 52, 54 at a distance from one another. The two flanges 52, 54 are separated from one another by a distance greater than the thickness of the wall 28 (this thickness being measured parallel to the axis Z).

FIGS. 3 and 4 also illustrate two locks 56 and 58.

The lock 56 has the purpose of closing the first accessway 16 to the recess 10. The lock 56 comprises a plate 60 of overall trapezoidal shape suitable for interacting with the grooves to provide this closing. The lock 56 comprises two tabs 62 protruding from the plate 60. The two tabs 58 are parallel.

Figure 5:
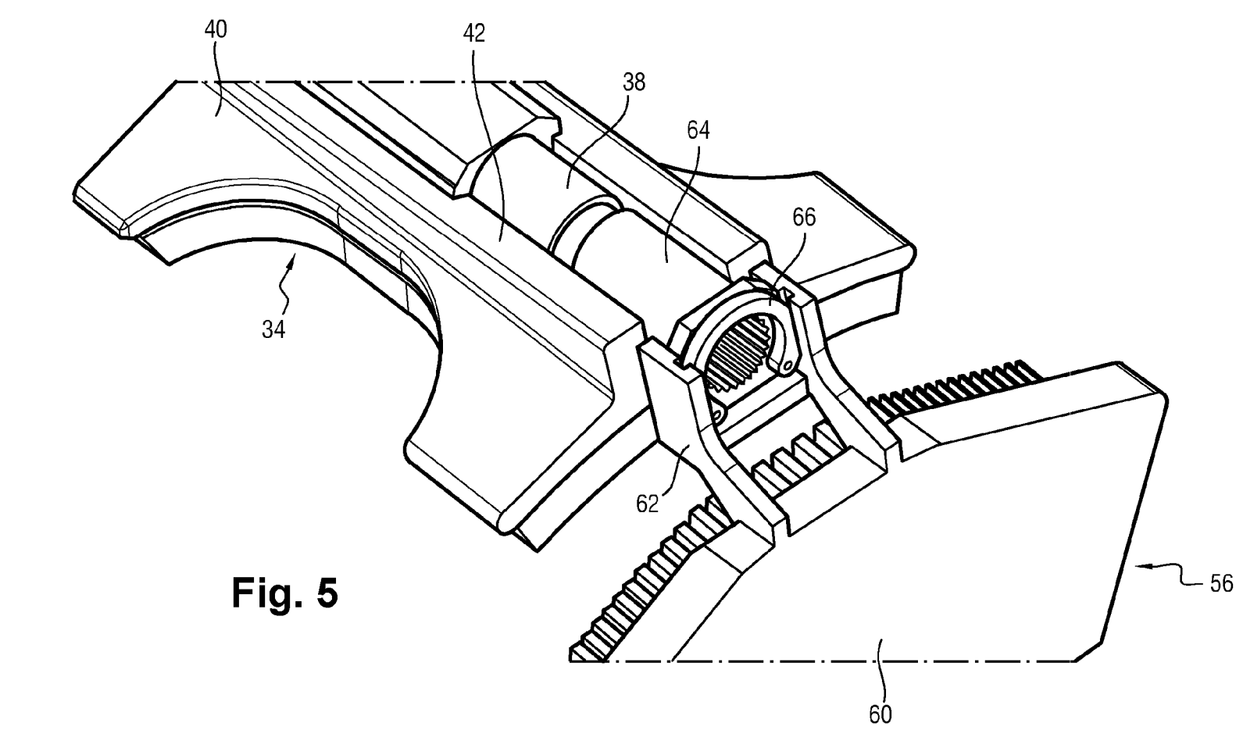
FIG. 5 is a bottom view detailing a part of the clamping device and one of the locks shown in FIG. 3.

With reference to FIG. 5, a removable socket 64 is suitable for meshing with the first end portion of the shank 38, displacing it in translation parallel to the axis of the shank 38. The socket 64 has a splined inner surface interacting with the first end portion of the shank 38, and has a shape suitable for being engaged between the tabs 62.

The tabs 62 define two opposing grooves.

Furthermore, a locking element 66, taking for example the form of a circlips, can bear in the two opposing grooves formed in the tabs 62.

Back to FIGS. 3 and 4, the lock 58 has the function of closing the second accessway 18 of the recess 10. The lock 58 comprises a plate 68 suitable for interacting with the grooves 22 formed in the fastener 9 to provide this closing. The lock 58 moreover comprises a base 70 defining an upper orifice half.

The base 70 moreover defines two tapped through holes, and two screws 72 engaged in the two tapped through holes.

The different elements previously described are mounted together in the following way, starting from the fastener 9 as shown in FIG. 2.

Figure 6:
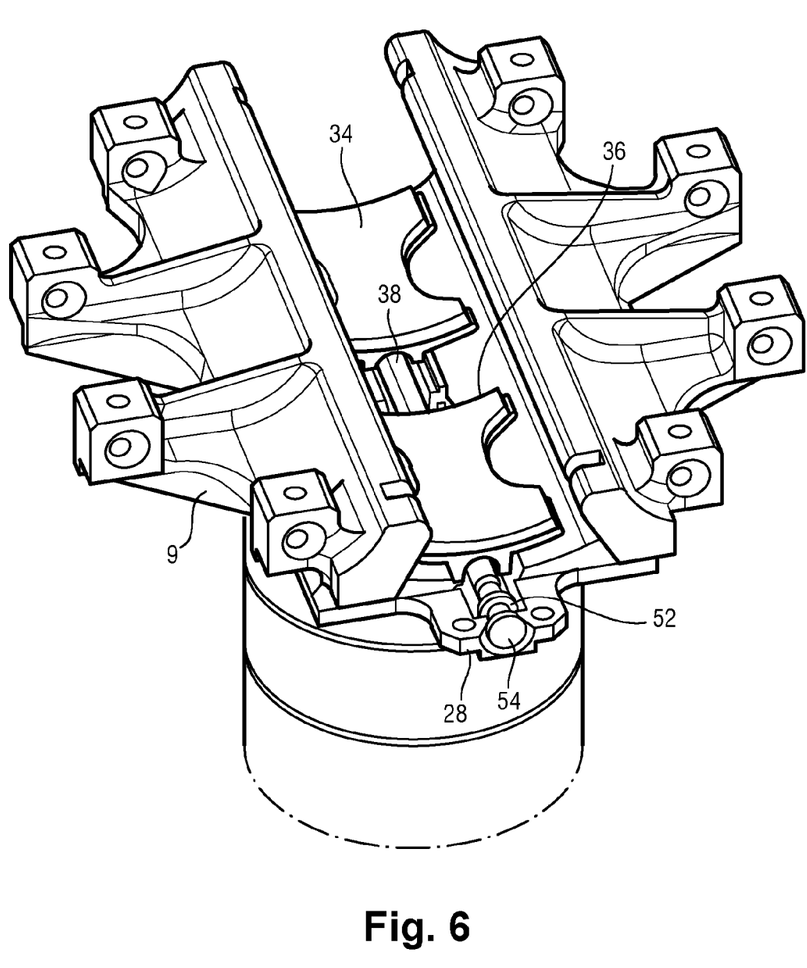
FIGS. 6 to 10 are views of the fastener and the clamping device at different stages of their assembly.

With reference to FIG. 6, the clamping device 32 is placed in the recess 10 such that the lower bearing wall 42 of the clamping element 34 rests on the bottom surface 24, and the lower wall of the clamping element 36 is simultaneously resting on the surface of 26.

Moreover, the clamping device 32 is placed such that the shank 38 traverses the half-orifice formed by the wall 28. The wall 28 is then between the two flanges 52 and 54. Moreover, the flange 52 is then located between the wall 28 and the clamping element 36.

Figure 7:
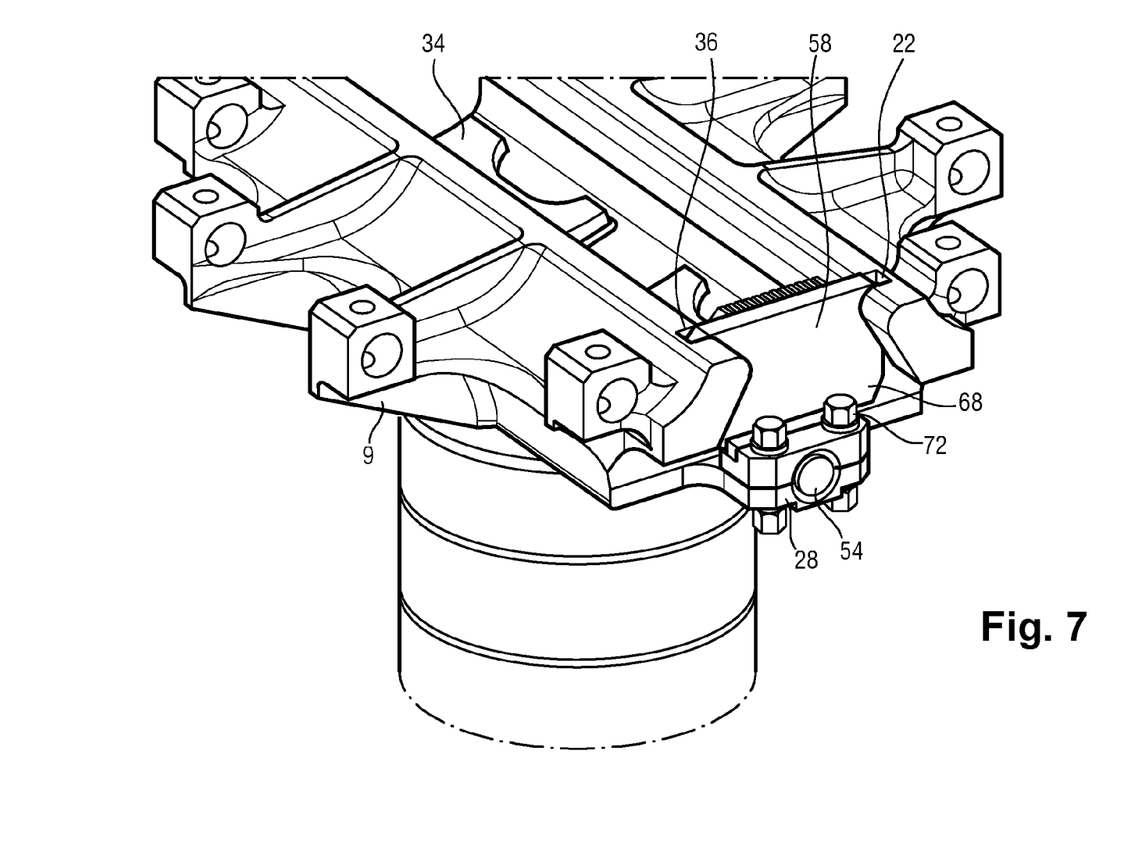

With reference to FIG. 7, the lock 58 is then engaged in the grooves 22, such as to close the accessway 18 to the recess 10. The screws 72 are engaged in the blind holes 30 and screwed into these holes 30 in such a way as to attach the lock 58 to the fastener 9.

The base 70 and the wall 24 then together define an orifice traversed by the shank 38, between the two flanges 52 and 54. These four elements, particularly the base 70, thus constitute stops which each limit the displacement track of the shank 38 along the Z axis.

From this stage onwards, the bottom surfaces 24, 26 form two slopes inclined with respect to the axis of rotation of the shank 38.

Figure 8:
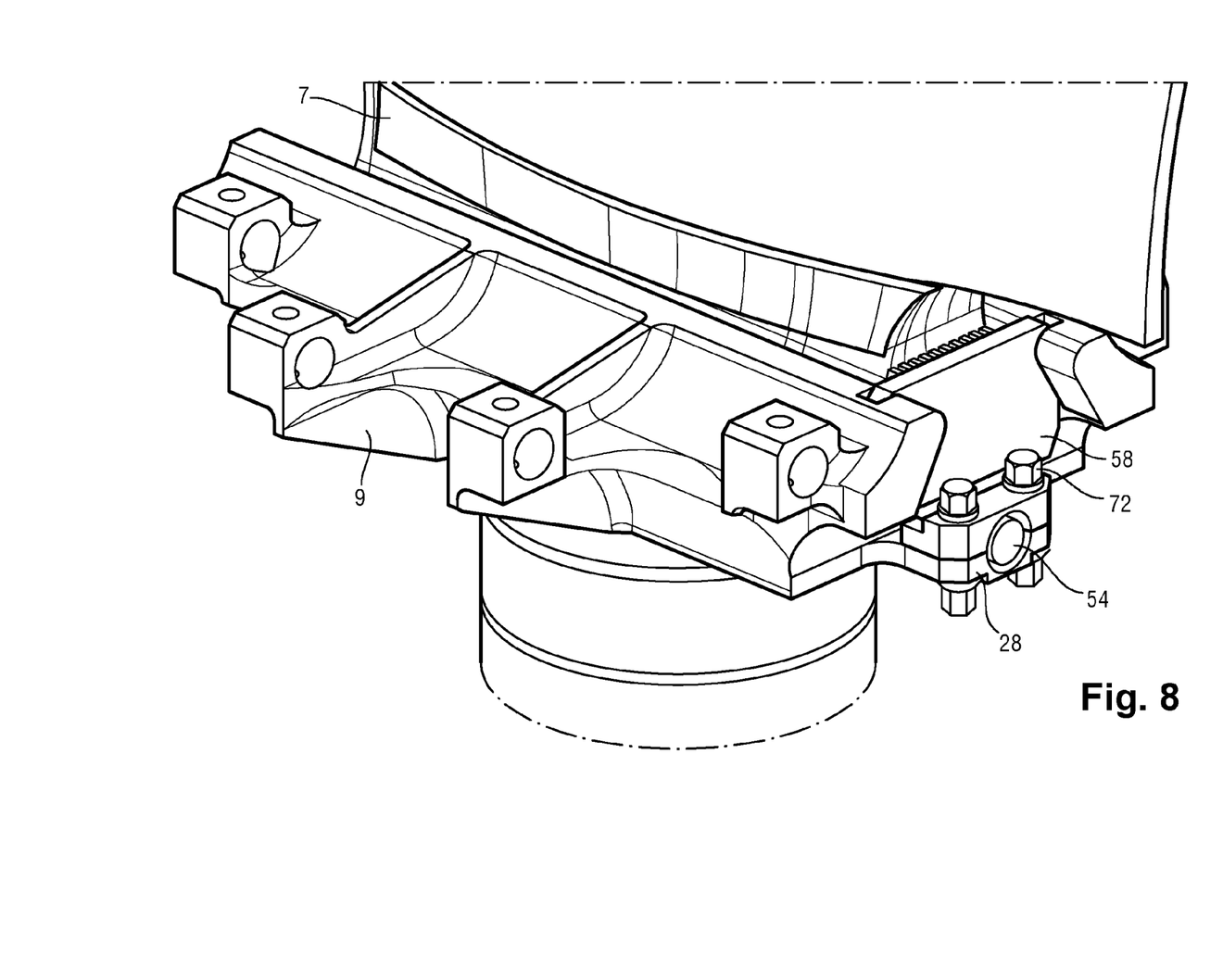

With reference to FIG. 8, the blade root 7 is then engaged in the recess 10 via the accessway 16 left open. The lock 58 prevents the blade root from coming out of the recess via the accessway 18.

Figure 9:
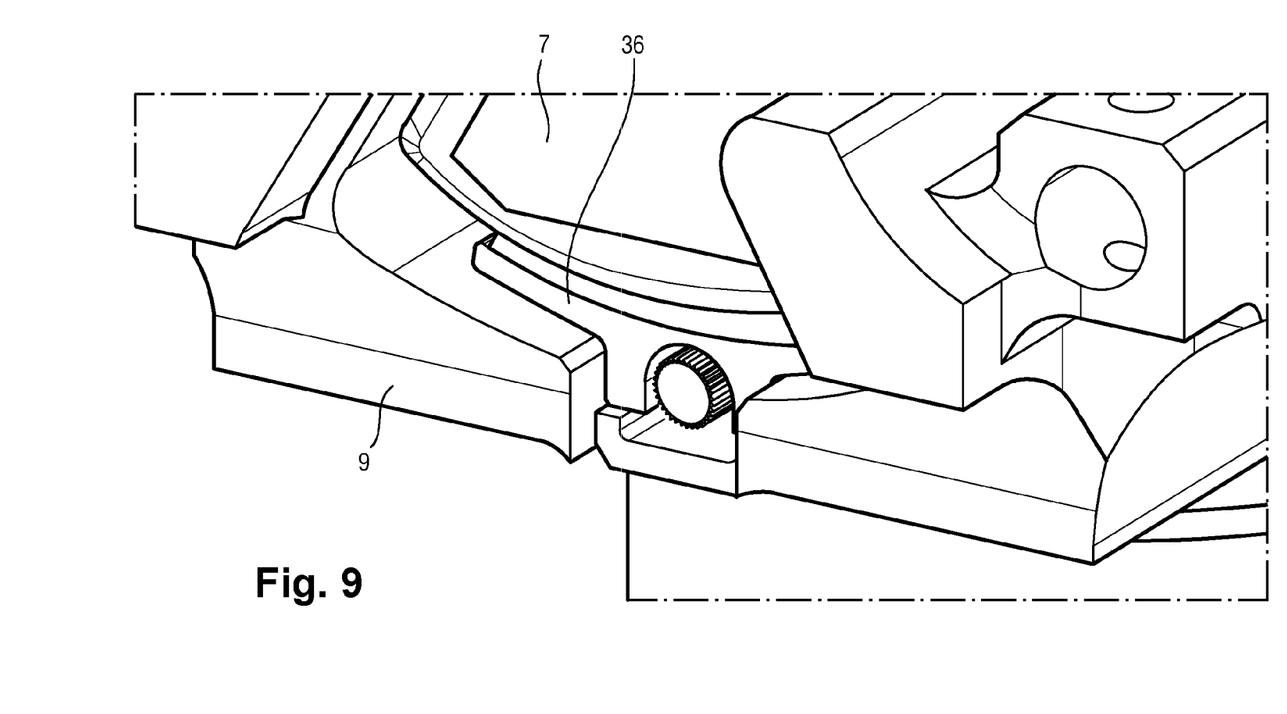

With reference to FIG. 9, the first end portion of the shank 38 is at this stage still accessible from the accessway 16.

A tool (not illustrated) is made to mesh with the first end portion of the shank 38. The tool is manual or motor-driven. The tool is then used to rotate the shank 38 with respect to the fastener 9 and the clamping elements 34, 36 in a first direction of rotation.

The rotation of the shank 38 in the first direction of rotation causes the displacement of the clamping element 34 in the recess 10 with respect to the fastener 9. The clamping element 34 then climbs the slope formed by the bottom surface 24, which brings the clamping element 34 closer to the blade root 7 engaged in the recess 10 and compresses the elastomer 44 against the blade root. In other words, the clamping force exerted by the clamping element 34 is increased when the shank is rotated in the first direction of rotation. When the slope formed by the bottom surface 24 is of straight profile, the displacement of the clamping element 34 with respect to the fastener 9 is a translation parallel to this slope.

The rotation of the shank 38 in the first direction of rotation further causes the displacement of the clamping element 36 in the recess 10 in relation to the fastener 9. The clamping element 36 then climbs the slope formed by the bottom surface 26, which brings the clamping element 36 closer to the blade root engaged in the recess 10 and compresses the elastomer of the clamping element 36 against the blade root. In other words, the clamping force exerted by the clamping element 36 is also increased when the shank is rotated in the first direction of rotation. When the slope formed by the bottom surface 26 has a straight profile, the displacement of the clamping element 36 with respect to the fastener 9 is a translation parallel to this slope.

The shank 38 is thus rotated until a clamping force on the blade root 7 is achieved which is high enough to prevent the flapping of the blade root in the recess when the turbomachine is in operation.

To reduce this clamping force, it is of course enough to rotate the shank 38 in a second direction of rotation opposite the first direction of rotation mentioned previously. In this case, the two clamping elements descend along their respective slopes 24, 26 and move away from one another, which allows the elastomers to relax.

Finally, the variation of the force exerted by the clamping element 34 on the blade root 7 and the variation of the force exerted by the clamping element 36 on the blade root 7 are of the same sign during a rotation of the shank 38: either these two forces increase simultaneously, or these two forces decrease simultaneously.

It will moreover be noted that, when the shank is rotated by a tool, this shank 38 is slightly displaced in a radial direction, due to the sloped nature of the bottom surfaces 24 and 28. Of course, the orifice traversed by this shank 38 and formed jointly by the wall 28 and the lock 58 is of suitable dimensions to permit this displacement.

In particular, the elastic layer 44 advantageously combines with the shank 38 and the two clamping elements 34, 36. Specifically, the stiffness of the shank 38 constitutes a pre-stressing. When the blade root moves radially away, a relaxation of the tensile pre-stress on the shank 38 occurs causing, by remaining under tensile stress, a mutual convergence of the clamping elements 34, 36 which then follow the blade root.

Figure 10:
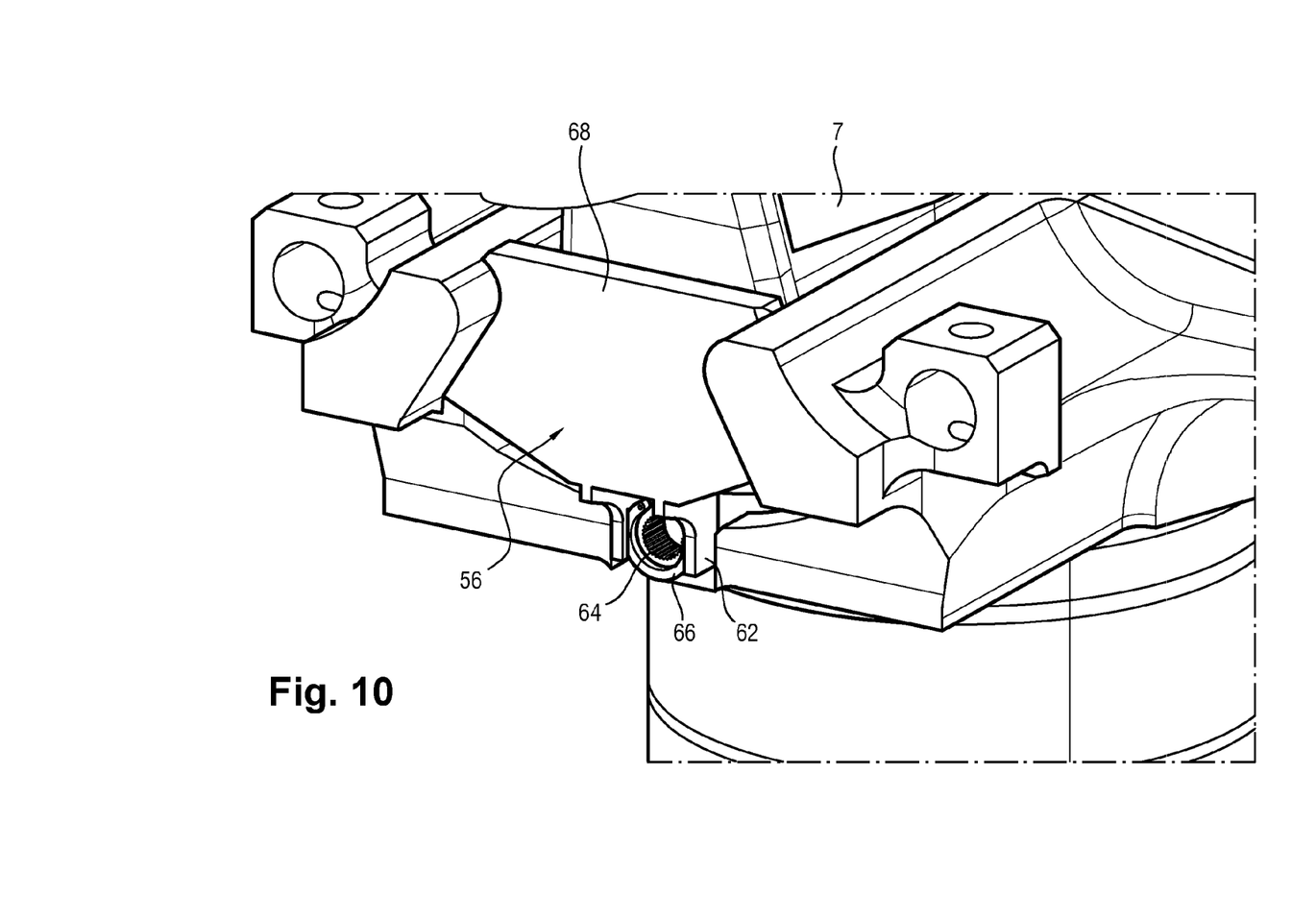

With reference to FIG. 10, the lock 56 is then engaged in the grooves 20 (The engagement is carried out in a centrifugal direction, i.e. from bottom to top in FIG. 10), such as to achieve an engaged position.

In the engaged position, the lock 56 closes the accessway 16, and thus prevents the blade root from coming out of the recess via the accessway 16. Moreover, in this engaged position, the two tabs 62 of the lock 56 together define a passage toward the first end portion of the shank 38.

The socket 64 is engaged in this passage, in such a way as to interact with this first end portion of the shank 38, instead and in place of the tool mentioned previously. At the same time, the socket attaches the plate 68 with respect to the fastener 9. Furthermore, the two tabs 62 lock the rotation of the socket 64 with respect to the fastener 9, and consequently the rotation of the shank 38 with respect to the fastener 9.

Finally, the first end portion of the shank 38, the lock 58 and the socket 64 together form an anti-rotation device suitable for preventing the rotation of the shank 38 with respect to the fastener 9. This is advantageous, since the functions of locking the blade root in the recess and anti-rotation of the shank are implemented as long as the number of parts is not large.

The locking element 66 is then engaged in the two opposing grooves formed in the two tabs 62 to prevent it coming out of the socket 64 during the passage defined between the two tabs 62.

The blade 7 is now firmly attached to the fastener 9, and ready for use.

With reference to FIG. 11, the following points should be noted:
 The axis of rotation of the shaft 38 is parallel to the surface of the blade root 7 on which the clamping elements 34, 36 bear;
 The lower bearing surfaces of the clamping elements 34, 36 are inclined with respect to the axis of rotation of the shank 38 and with respect to the surface of the blade root on which the clamping elements bear.

The assembly for a turbomachine previously described with reference to the appended figures can be the subject of variants. In particular:
 Although the presence of two clamping elements is advantageous to better distribute the clamping force over the blade root, a single clamping element is enough to obtain a very high clamping force.
 When two clamping elements are present in the recess, provision can be made for the forces exerted by these two clamping elements on the blade root to increase when the two clamping elements come nearer to one another, as illustrated, or contrariwise when they move away from one another, in a non-illustrated variant. In this non-illustrated variant, the two bottom surfaces on which the two clamping elements respectively bear together form a hollow at the center of the bottom of the recess.
 In the illustrated embodiment, the elastomer presses against the blade root, which avoids damaging the latter. Provision could however be made for arranging this elastomer against the bottom of the recess 10 in a non-illustrated variant.

The invention claimed is:

1. An assembly for a turbomachine blade, the assembly comprising:
 a fastener defining a recess for receiving a blade root, and
 a clamping device for clamping the blade root against the fastener when the blade root is in the recess, the clamping device comprising:
  a clamping element configured to bear simultaneously on the blade root and on the fastener in the recess so as to exert a clamping force on the blade root, the clamping element defining a tapped hole, wherein the clamping element comprises an elastic layer arranged to bear in the recess on the blade root and to be compressed by the blade root when the clamping force is exerted,
  a shank comprising a thread coupled to the tapped hole so that a rotation of the shank with respect to the clamping element causes a variation in the clamping force exerted by the clamping element on the blade root, wherein the shank comprises an end portion configured to mesh with a tool and to be rotationally driven by the tool
 an anti-rotating device configured to prevent a rotation of the shank with respect to the fastener, wherein the anti-rotation device comprises:
  a lock preventing the root from coming out of the recess, the end portion of the shank,
a removable socket configured to mesh with the end portion and for
simultaneously meshing with the second lock.

2. As claimed in claim 1, wherein:
the clamping element is configured to be displaced with respect to the fastener when the shank is rotated with respect to the fastener,
a displacement of the clamping element with respect to the fastener causes the variation of the clamping force exerted by the clamping element on the root.

3. The assembly as claimed in claim 1, wherein the clamping element bears on a bottom surface of the recess forming a slope inclined with respect to the axis of rotation of the shank.

4. The assembly as claimed in claim 1, wherein the clamping element comprises a metallic part defining the tapped hole.

5. The assembly as claimed in claim 1, wherein the elastic layer has a thickness ranging from 1 millimeter to 4 millimeters.

6. The assembly as claimed in claim 1, wherein the clamping device comprises a stop limiting a stroke of translation of the shank along the axis of rotation of the shank with respect to the fastener.

7. The assembly as claimed in claim 6, comprising a first lock preventing the root from leaving the recess, the first lock comprising the stop.

8. The assembly as claimed in claim 1, wherein the shank comprises an end portion configured to mesh with a tool and to be rotationally driven by the tool.

9. The assembly as claimed in claim 8, wherein the end portion is splined.

10. The assembly as claimed in claim 1, wherein:
the clamping device comprises a second clamping element, the second clamping element being configured to bear simultaneously on the root and on the fastener in the recess such as to exert a second clamping force on the root, the second clamping element defining a second tapped hole,
the shank comprises a second thread coupled to the second tapped hole so that a rotation of the shank with respect to the second clamping element causes a variation of the second clamping force, wherein the variation of the clamping force and the variation of the second clamping force have a same sign.

11. The assembly as claimed in claim 10, wherein
the clamping element and the second clamping element are configured to be displaced with respect to the fastener when the shank is rotated with respect to the fastener,
respective displacements of the clamping element and of the second clamping element with respect to the fastener cause the variation of the clamping force and the variation of the second clamping force.

12. The assembly as claimed in claim 10, wherein the clamping element and the second clamping element are configured to move away from or move towards one another, when the shank is rotated about the axis of rotation with respect to the fastener.

13. An assembly for a turbomachine blade, the assembly comprising:
a fastener defining a recess for receiving a blade root, and
a clamping device for clamping the blade root against the fastener when the blade root is in the recess, the clamping device comprising:
a clamping element configured to bear simultaneously on the blade root and on the fastener in the recess so as to exert a clamping force on the blade root, the clamping element defining a tapped hole, wherein the clamping element comprises an elastic layer arranged to bear in the recess on the blade root and to be compressed by the blade root when the clamping force is exerted,
a second clamping element, the second clamping element being configured to bear simultaneously on the root and on the fastener in the recess such as to exert a second clamping force on the root, the second clamping element defining a second tapped hole,
a shank comprising: a thread coupled to the tapped hole so that a rotation of the shank with respect to the clamping element causes a variation in the clamping force exerted by the clamping element on the blade root, and a second thread coupled to the second tapped hole so that a rotation of the shank with respect to the second clamping element causes a variation of the second clamping force, wherein the variation of the clamping force and the variation of the second clamping force have a same sign,
wherein the clamping element and the second clamping element are configured to move away from or move towards one another, when the shank is rotated about the axis of rotation with respect to the fastener.

* * * * *